(12) United States Patent
Maity et al.

(10) Patent No.: US 11,386,680 B2
(45) Date of Patent: Jul. 12, 2022

(54) SYSTEM AND METHOD OF IDENTIFYING VEHICLE BRAND AND MODEL

(71) Applicant: WIPRO LIMITED, Bangalore (IN)

(72) Inventors: Sandip Kumar Maity, Kestapur (IN); Sumit Shovon Mitra, New Town (IN); Debasish Chanda, Maheshtala (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/835,525

(22) Filed: Mar. 31, 2020

(65) Prior Publication Data

US 2021/0303907 A1    Sep. 30, 2021

(30) Foreign Application Priority Data

Mar. 28, 2020 (IN) .............................. 202041013657

(51) Int. Cl.
| | | |
|---|---|---|
| *G06K 9/32* | (2006.01) | |
| *G06K 9/00* | (2022.01) | |
| *G06V 20/62* | (2022.01) | |
| *G06V 20/58* | (2022.01) | |
| *G06V 30/10* | (2022.01) | |

(52) U.S. Cl.
CPC ............ *G06V 20/62* (2022.01); *G06V 20/584* (2022.01); *G06V 20/625* (2022.01); *G06V 30/10* (2022.01); *G06V 2201/08* (2022.01); *G06V 2201/09* (2022.01)

(58) Field of Classification Search
None
See application file for complete search history.

(56) References Cited

U.S. PATENT DOCUMENTS

| | | | | |
|---|---|---|---|---|
| 8,301,363 | B2 * | 10/2012 | Grassi .................... | G08G 1/054 |
| | | | | 701/119 |
| 2017/0061506 | A1 * | 3/2017 | Dow .................. | G06Q 30/0278 |
| 2017/0300786 | A1 * | 10/2017 | Gope ......................... | G06T 5/20 |
| 2018/0114337 | A1 * | 4/2018 | Li .............................. | G06T 7/73 |
| 2019/0279293 | A1 * | 9/2019 | Tang ........................ | G06N 3/084 |
| 2019/0347487 | A1 * | 11/2019 | Booth ................ | G06K 9/00744 |
| 2020/0065885 | A1 * | 2/2020 | Smith ................ | G06Q 30/0635 |
| 2021/0303907 | A1 * | 9/2021 | Maity .................... | G06V 20/62 |

FOREIGN PATENT DOCUMENTS

| | | |
|---|---|---|
| CN | 103488973 B | 1/2014 |
| CN | 105787437 B | 4/2017 |
| CN | 104063712 B | 6/2018 |
| CN | 105975941 B | 4/2019 |

* cited by examiner

*Primary Examiner* — Tahmina N Ansari
(74) *Attorney, Agent, or Firm* — Finnegan, Henderson, Farabow, Garrett & Dunner, LLP

(57) ABSTRACT

The present invention relates to a method of identifying a brand and a model of a vehicle. The method comprises obtaining one or more video frames. Further, the method comprises detecting one of presence or absence of text in the at least one vehicle. Upon detecting the presence of the text, the method comprises determining at least one of the brand and the model of the at least one vehicle by accumulating the text recognized in the one or more video frames. Further, identifying at least one of the brand and the model of the at least one vehicle based on an accumulated text. Upon detecting the absence of the text, the method comprises determining the brand of the at least one vehicle based on logo associated with the vehicle.

19 Claims, 12 Drawing Sheets

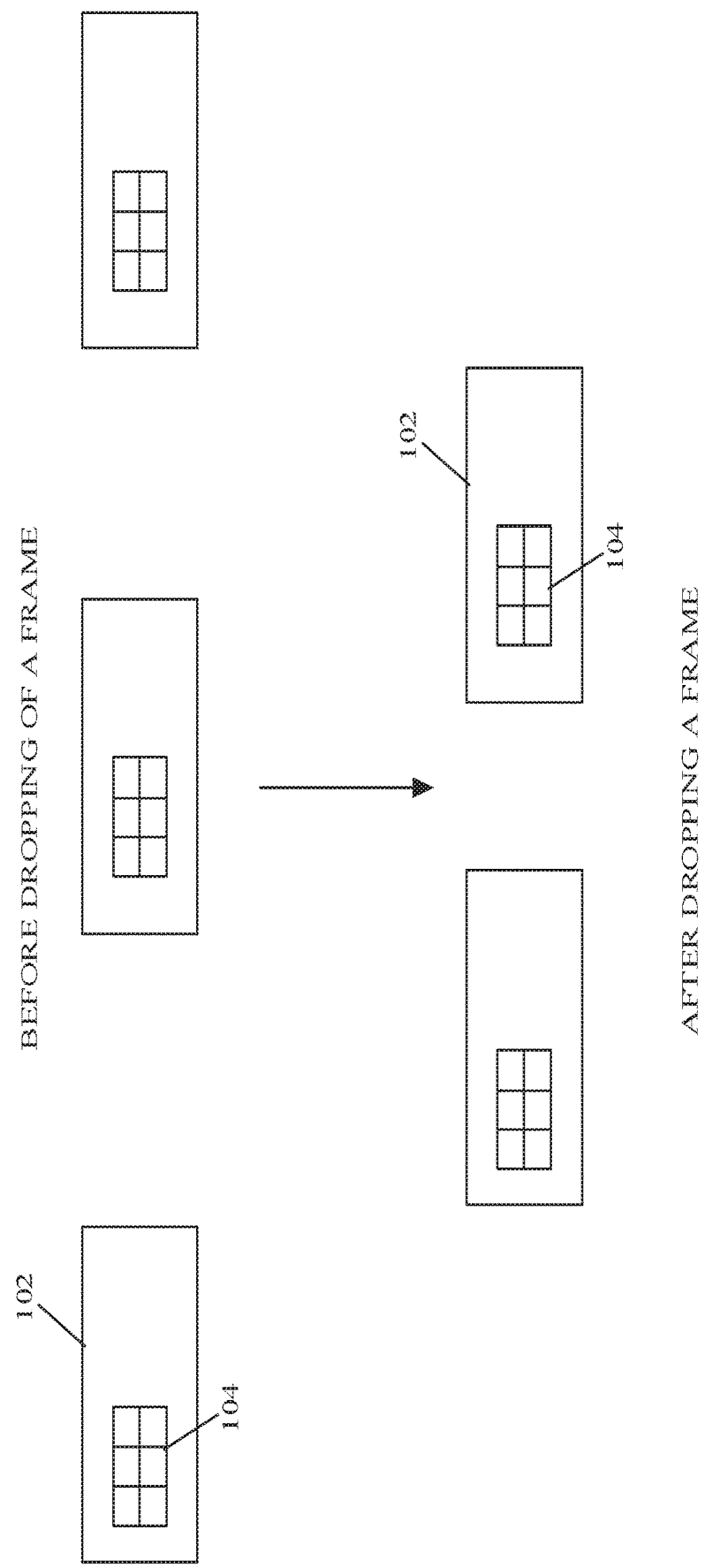

| BRAND | Yamaha | Honda | Kawasaki | Bajaj | Hero | Tvs |
|---|---|---|---|---|---|---|
| MODEL | Fazer | Active | Ninja | Chetak | Meastro | Apache |
| | Fz*** | Unicon | Versys | Pulsar | Xtreame | Star city |
| | R15*** | Cb | Vulcan | Dominar | Pleasure | Zeppelin |
| | Yzf** | Aviator | Klx | Platina | Splendor | Jupiter |
| | Monster | Dream | Streat | Ct | Duet | Creon |
| | MT*** | Dio | Z*** | Discover | Glamour | Sport |
| | Fascino | Crf | | Avenger | Ava | Ntorq |
| | Aerox | Livo | | | xpulse | Radeon |
| | Xsr*** | Navi | | | | Victor |
| | Wr*** | Cliq | | | | Wego |
| | Alpha | Shine | | | | Xl |
| | R1 | Hornet | | | | Max |
| | R3 | | | | | Scooty |
| | Sz | | | | | phoenix |
| | Saluto | | | | | |
| | Ray | | | | | |
| | vmax | | | | | |

409

| BRAND | Honda | Maruti | Tata | Audi | Hyndai | BMW |
|---|---|---|---|---|---|---|
| MODEL | Brio | Alto | Nano | A3 | Santro | X2 |
| | Amaze | Celerio | Altroz | A4 | Verna | X3 |
| | City | Swift | Tiago | A5 | Venue | X4 |
| | Cr-v | Baleno | tigor | A6 | Xcent | X5 |
| | Accord | Xl6 | Winger | A8 | Creta | X6 |
| | Nsx | Dezire | Harrier | Q3 | Eon | M4 |
| | Br-v | Jimny | Hexa | Q7 | I20 | M5 |
| | Wr-v | Vitara | Tamo | R8 | I10 | M6 |
| | jazz | Ciaz | Bolt | RS5 | | M3 |
| | | | Magic | RS6 | | X1 |
| | | | Safari | RS7 | | Z4 |
| | | | Sumo | S4 | | |
| | | | Zest | S6 | | |
| | | | venture | TT | | |

FIGURE 4H

SYSTEM AND METHOD OF IDENTIFYING VEHICLE BRAND AND MODEL

TECHNICAL FIELD

The present disclosure relates to the field of computer vision and image processing.

Particularly, but not exclusively, the present disclosure relates to a method of identifying a brand and a model of a vehicle.

BACKGROUND

In recent times, a need to identify a brand and a model of a vehicle or an automobile are increasing. The brand and the model of the vehicle are used in various applications such as automatic vehicle surveillance, traffic management, driver assistance systems, traffic behavior analysis, traffic monitoring, vehicular networks, market research, and market analysis. The existing techniques recognize the brand and the model based on a license plate associated with the vehicle, shape of the vehicle, logo of the vehicle, and the like. Further, the existing techniques need to be trained when a new vehicle is to be recognized, when the shape of the existing vehicle is modified, for the different license plate formats based on a geographical area, when the logo associated with the brands is modified, when the position of the logo on the vehicle is moved to a new position and the like. Furthermore, the existing techniques may require high computational resources and high latency for processing an image of the vehicle to recognize the brand and model of the vehicle.

The information disclosed in this background of the disclosure section is only for enhancement of understanding of the general background of the invention and should not be taken as an acknowledgement or any form of suggestion that this information forms the prior art already known to a person skilled in the art.

SUMMARY

Other embodiments and aspects of the disclosure are described in detail herein and are considered a part of the claimed disclosure.

Disclosed herein is a computing system, for identifying a brand and a model of a vehicle. The computing system includes a processor and a memory communicatively coupled to the processor, where the memory stores the processor executable instructions, which, on execution, causes the processor to obtain one or more video frames with at least one vehicle in the one or more video frames from at least one video capturing device. Further, the processor is configured to detect one of a presence or an absence of a text associated with the at least one vehicle in the one or more video frames. Upon detecting the presence of the text, the processor is configured to determine at least one of the brand and the model of the at least one vehicle in the one or more video frames by performing at least one of accumulating the text recognized in the one or more video frames associated with the at least one vehicle based on image processing techniques and character recognition techniques. Further, identifying at least one of the brand and the model of the at least one vehicle based on an accumulated text. Upon detecting the absence of the text, the processor is configured to determine the brand of the at least one vehicle in the one or more video frames based on a logo associated with the vehicle, wherein the logo is identified using a first convolution neural network from the one or more video frames.

Embodiments of the present disclosure discloses a method of identifying a brand and a model of a vehicle. The method comprises obtaining one or more video frames with at least one vehicle in the one or more video frames from at least one video capturing device. Further, the method comprises detecting one of a presence or an absence of a text associated with the at least one vehicle in the one or more video frames. Upon detecting the presence of the text, the method comprises determining at least one of the brand and the model of the at least one vehicle in the one or more video frames by performing at least one of accumulating the text recognized in the one or more video frames associated with the at least one vehicle based on image processing techniques and character recognition techniques. Further, identifying at least one of the brand and the model of the at least one vehicle based on an accumulated text. Upon detecting the absence of the text, the method comprises determining the brand of the at least one vehicle in the one or more video frames based on a logo associated with the vehicle, wherein the logo is identified using a first convolution neural network from the one or more video frames.

Embodiments of the present disclosure discloses a non-transitory computer readable medium including instructions stored thereon that when processed by at least one processor cause a device to perform operations comprising obtaining one or more video frames with at least one vehicle in the one or more video frames from at least one video capturing device. Further, the device performs detecting one of a presence or an absence of a text associated with the at least one vehicle in the one or more video frames. Upon detecting the presence of the text, the device performs determining at least one of the brand and the model of the at least one vehicle in the one or more video frames, by performing at least one of accumulating the text recognized in the one or more video frames associated with the at least one vehicle based on image processing techniques and character recognition techniques. Further, identifying at least one of the brand and the model of the at least one vehicle based on an accumulated text. Upon detecting the absence of the text, the device performs determining the brand of the at least one vehicle in the one or more video frames based on a logo associated with the at least one vehicle, wherein the logo is identified using a first convolution neural network from the one or more video frames.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

FIG. 4D shows an exemplary dropping of a frame from the one or more video frames, in accordance with some embodiments of the present disclosure;

FIG. 4H shows an exemplary mapping table for identifying a brand and a model of a vehicle, in accordance with some embodiments of the present disclosure.

Figure 1:
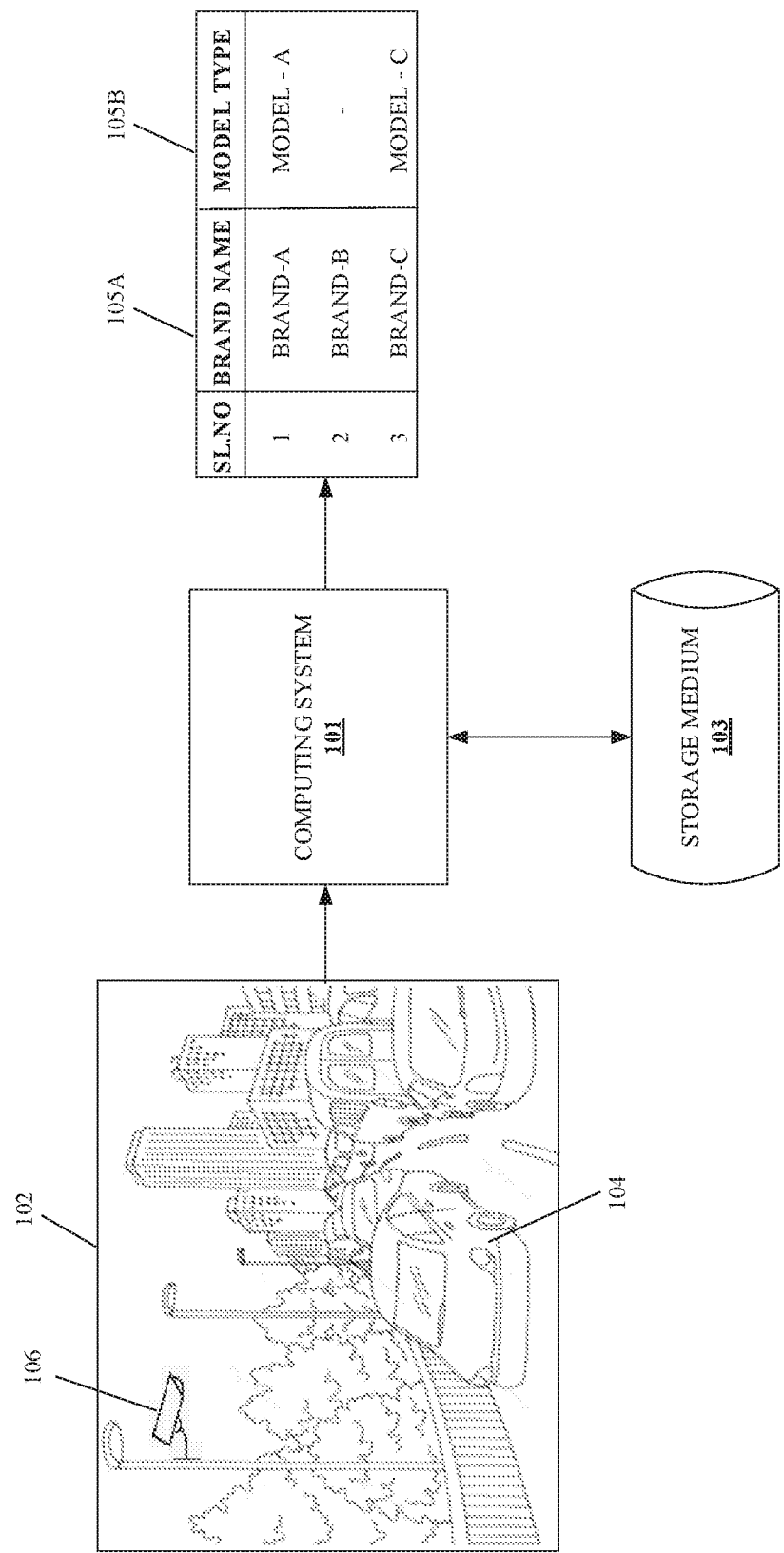
FIG. 1 shows an exemplary environment for identifying a brand and a model of a vehicle, in accordance with some embodiments of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for identifying a brand and a model of a vehicle, in accordance with some embodiments of the present disclosure.

In an embodiment, a computing system (101) may be used to identify the brand (105A) and the model (105B) of at least one vehicle (104). The at least one vehicle (104) may be a car, bus, truck, bike, scooter, bicycle and the like. The computing system (101) may be implemented using a server, a smartphone, a tablet computer, a desktop computer and the like. The computing system (101) may obtain one or more video frames (102) associated with a video from at least one video capturing device (106). The one or more video frames (102) may include at least one vehicle (104). The at least one video capturing device (106) may be a camera housed adjacent to a road, a smartphone with a camera, a standalone camera, an infrared camera, and the like. The one or more video frames (102) received by the computing system (101) may be a real-time video or a pre-recorded video stored in a storage medium (103) associated with the computing system (101). The storage medium (103) may be at least one of a compact disc, database, hard disk, Universal Serial Bus (USB) based storage device and the like. The storage medium (103) may be housed inside the computing system (101). In another embodiment, the storage medium (103) may be external to the computing system (101) as shown in FIG. 1. The computing system (101) may receive the one or more video frames (102) from the at least one video capturing device (106) and may identify the at least one vehicle (104) in the one or more video frames (102) using a second convolution neural network.

In one implementation, the computing system (101) may determine a location of a segment associated with the at least one vehicle (104) in the one or more video frames (102). The segment indicates a plurality of pixels comprising the at least one vehicle (104) in the one or more video frames (102). The location indicates the position of the segment in the video frame. The location may be denoted using a row number and a column number of a polygon encompassing the at least one vehicle (104). Further, the computing system (101) may detect one of a presence or an absence of a text associated with the at least one vehicle (104) in the one or more video frames (102). The presence or the absence of the text is detected in the segment of the one or more video frames (102) using a deep learning technique. The computing system (101) may identify a portion in the segment comprising the text. The portion of the segment may include plurality of pixels comprising the text.

In an embodiment, upon detecting the presence of the text, the computing system (101) may determine at least one of the brand (105A) and the model (105B) of the at least one vehicle (104) in the one or more video frames (102). The computing system (101) may recognize the text present in the portion of the segment using image processing techniques and character recognition techniques. Further, the computing system (101) may accumulate the text recognized in the portion of the segment in the one or more video frames (102). The computing system (101) may determine the brand (105A) and the model (105B) of the at least one vehicle (104) by identifying the accumulated text using a mapping table stored in the storage medium (103). The mapping table may include the names of the brand (105A) and the model (105B) of a plurality of the vehicles. The accumulated text is matched with the mapping table to identify the brand (105A) and the model (105B) of the at least one vehicle (104). For example, the brand (105A) and the model (105B) of the at least one vehicle (104) with a serial number 1 and 3 determined based on the presence of the text as shown in FIG. 1.

In another embodiment, upon detecting the absence of the text in the segment of the one or more video frames (102), the computing system (101) may determine the brand (105A) of the at least one vehicle (104) in the one or more video frames (102) based on a logo associated with the vehicle. The computing system (101) may identify the logo from the segment of one or more video frames (102) using a first convolution neural network. In an embodiment, the computing system (101) may determine the brand (105A) of the at least one vehicle (104) based on the logo when the recognition of the text from the plurality of pixels fails. For example, the brand (105A) of the at least one vehicle (104) with a serial number 2 may be determined based on the logo when the absence of the text is detected as shown in FIG. 1.

Figure 2:
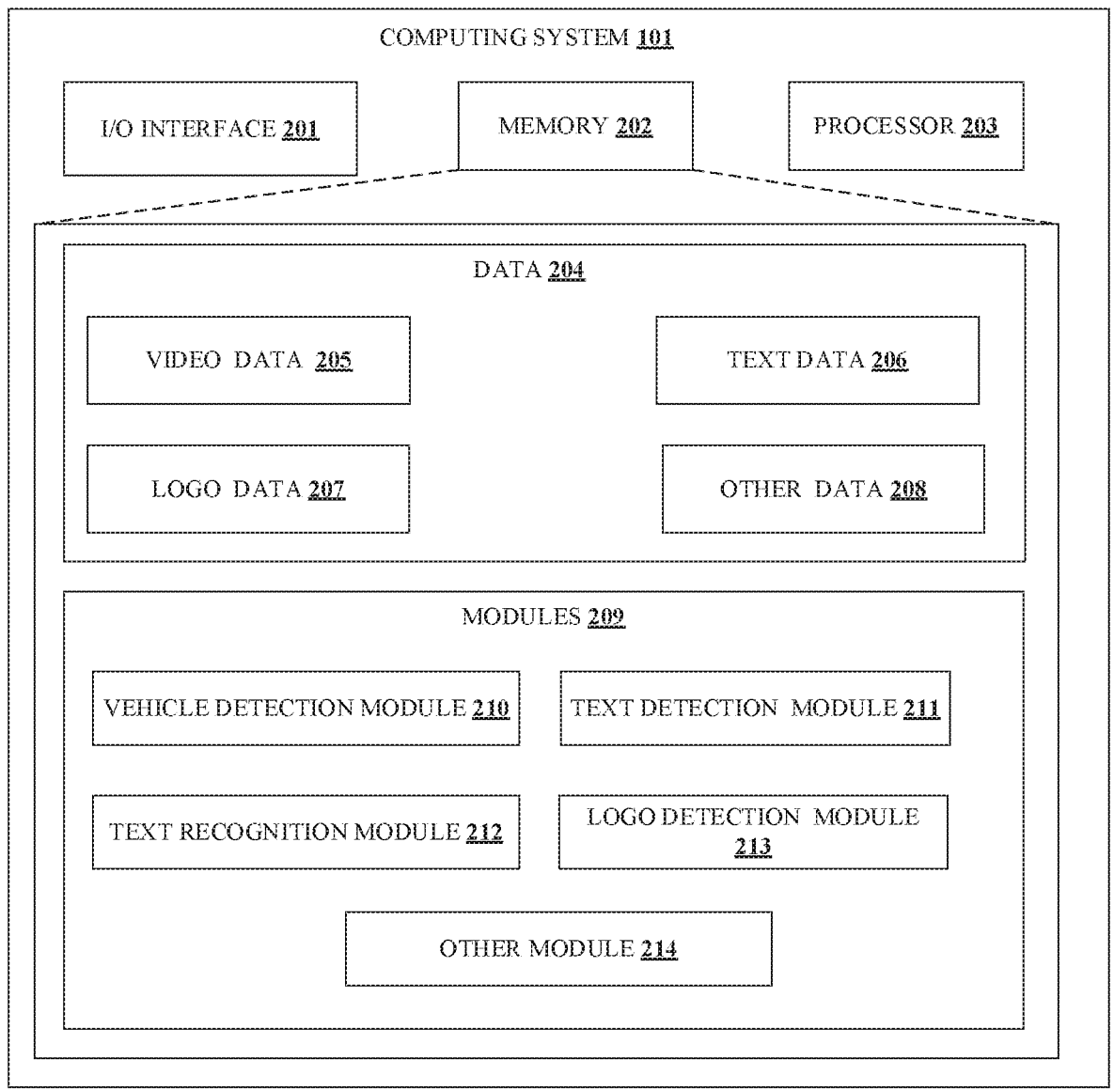
FIG. 2 shows a detailed block diagram of a computing system, in accordance with some embodiments of the present disclosure.

FIG. 2 shows a detailed block diagram of the computing system (101) for identifying the brand (105A) and the model (105B) of the at least one vehicle (104), in accordance with some embodiments of the present disclosure.

The computing system (101) may include a Central Processing Unit ("CPU" or "processor") (203) and a memory (202) storing instructions executable by the processor (203). The processor (203) may include at least one data processor for executing program components for executing user or system-generated requests. The memory (202) may be communicatively coupled to the processor (203). The computing system (101) further includes an Input/Output (I/O) interface (201). The I/O interface (201) may be coupled with the processor (203) through which an input signal or/and an output signal may be communicated. In one embodiment, the one or more video frames (102) may be received through the I/O interface (201).

In some implementations, the computing system (101) may include data (204) and modules (209). As an example, the data (204) and modules (209) may be stored in the memory (202) configured in the computing system (101). In one embodiment, the data (204) may include, for example, a video data (205), a text data (206), a logo data (207), and other data (208). In the illustrated FIG. 2, data (204) are described herein in detail. The data (204) and the storage medium (103) may be used interchangeable in the disclosure herein.

In an embodiment, the video data (205) may include one or more video frames (102) associated with the video. The video may be captured by the at least one video capturing device (106). The video data (205) may include a real-time video or a pre-recorded video.

In an embodiment, the text data (206) may include the text recognized in the segment of the one or more video frames (102) associated with the video. Further, the text data (206) may include the mapping table includes the names of the brand (105A) and model (105B) of a plurality of vehicles.

In an embodiment, the logo data (207) may include a plurality of pixels comprising the logo of the at least one vehicle (104) obtained from the one or more video frames (102). Further, the logo data (207) may include one or more logos associated with the plurality of vehicles and the brand (105A) name associated with the one or more logos.

In an embodiment, the other data (208) may include at least one of image processing techniques, character recognition techniques, one or more attributes associated with the first convolution neural network, the second convolution neural network, deep learning technique and the like.

In some embodiments, the data (204) may be stored in the memory (202) in the form of various data structures. Additionally, the data (204) may be organized using data models, such as relational or hierarchical data models. The other data (208) may store data, including temporary data and temporary files, generated by the modules (209) for performing the various functions of the computing system (101).

In some embodiments, the data (204) stored in the memory (202) may be processed by the modules (209) communicatively coupled to the processor (203) of the computing system (101). The modules (209) may be stored within the memory (202) as shown in FIG. 2. In one embodiment, the modules (209) may be present outside the memory (202) and implemented as hardware. As used herein, the term modules (209) may refer to an Application Specific Integrated Circuit (ASIC), an FPGA (Field Programmable Gate Array), an electronic circuit, a processor (shared, dedicated, or group) that execute one or more software or firmware programs, a combinational logic circuit, and/or other suitable components that provide the described functionality.

In one implementation, the modules (209) may include, for example, a vehicle detection module (210), a text detection module (211), a text recognition module (212), a logo detection module (213) and other module (214). It may be appreciated that such aforementioned modules (209) may be represented as a single module or a combination of different modules.

In an embodiment, the vehicle detection module (210) may identify the at least one vehicle (104) in each of the one or more video frames (102) using the second convolution neural network. The second convolution neural network may be pre-trained network to detect the at least one vehicle (104). Further, the vehicle detection module (210) may determine the location of the segment in the each frame among the one or more video frames (102), where the segment comprises the at least one vehicle (104). The location indicates the position of the segment in the video frame. The location may be denoted using a row number and a column number of the polygon encompassing the at least one vehicle (104). For example, the segment may be denoted using the polygon (i.e. a rectangle or a square) encompassing the at least one vehicle (104) and the location may be denoted using the coordinates of the polygon as $[(X_1, Y_1), (X_2, Y_2), (X_3, Y_3), (X_4, Y_4)]$, where the X and Y are integers.

In an embodiment, the text detection module (211) may detect one of the presence or the absence of the text in the segment comprising the at least one vehicle (104) in the one or more video frames (102). The text detection module (211) may identify the presence or the absence of the text in each of the one or more video frames (102) using a deep learning technique. The deep learning technique may be pre-trained for detecting the text from the one or more video frames (102). Further, the text detection module (211) may identify the portion of the segment comprising the text, in each of the one or more video frames (102). The portion of the segment includes the plurality of pixels comprising the text.

In an embodiment, the text recognition module (212) may apply the image processing techniques on the portion of the segment comprising the text. The image processing techniques may include transforming the portion of the segment from a color image to a grayscale image, modifying a contrast, noise removal, binarizing, and modifying an orientation, of the portion of the segment. Further, the text recognition module (212) may apply the character recognition techniques to recognize the text in the portion of the segment from one or more video frames (102). For example, the character recognition techniques may include optical character recognition, clustering based character recognition, neural network based character recognition, pattern matching based character recognition and the like.

In an embodiment, the logo detection module (213) may identify one or more Regions of Interest (ROIs) in the one or more video frames (102) using a selective search technique. For example, the ROIs indicates the location of the logo in the at least one vehicle (104). The location may be on the left side of the tank, on a rearguard of the at least one vehicle (104), and the like. Further, the logo detection module (213) may generate a feature vector using the first convolution neural network based on the one or more ROIs. The feature vector may be indicative of a pattern associated with the logo. Furthermore, the logo detection module (213) may determine the logo and the brand (105A) based on the feature vector using the first convolution neural network.

In an embodiment, the other module (214) may be used to receive the real-time video from the at least one video capturing device (106), store the video in the storage medium (103), receive the mapping table from a user and store the mapping table in the storage medium (103), modify a count associated with the one or more video frames (102) by performing one of a frame interpolation (i.e. addition of a frame) or dropping (i.e. deleting/removing) a frame and the like. For example, the frame interpolation is performed when the at least one vehicle is moving at a higher speed and the dropping of the frame is performed when the at least one vehicle is moving at a lower speed.

Figure 3:
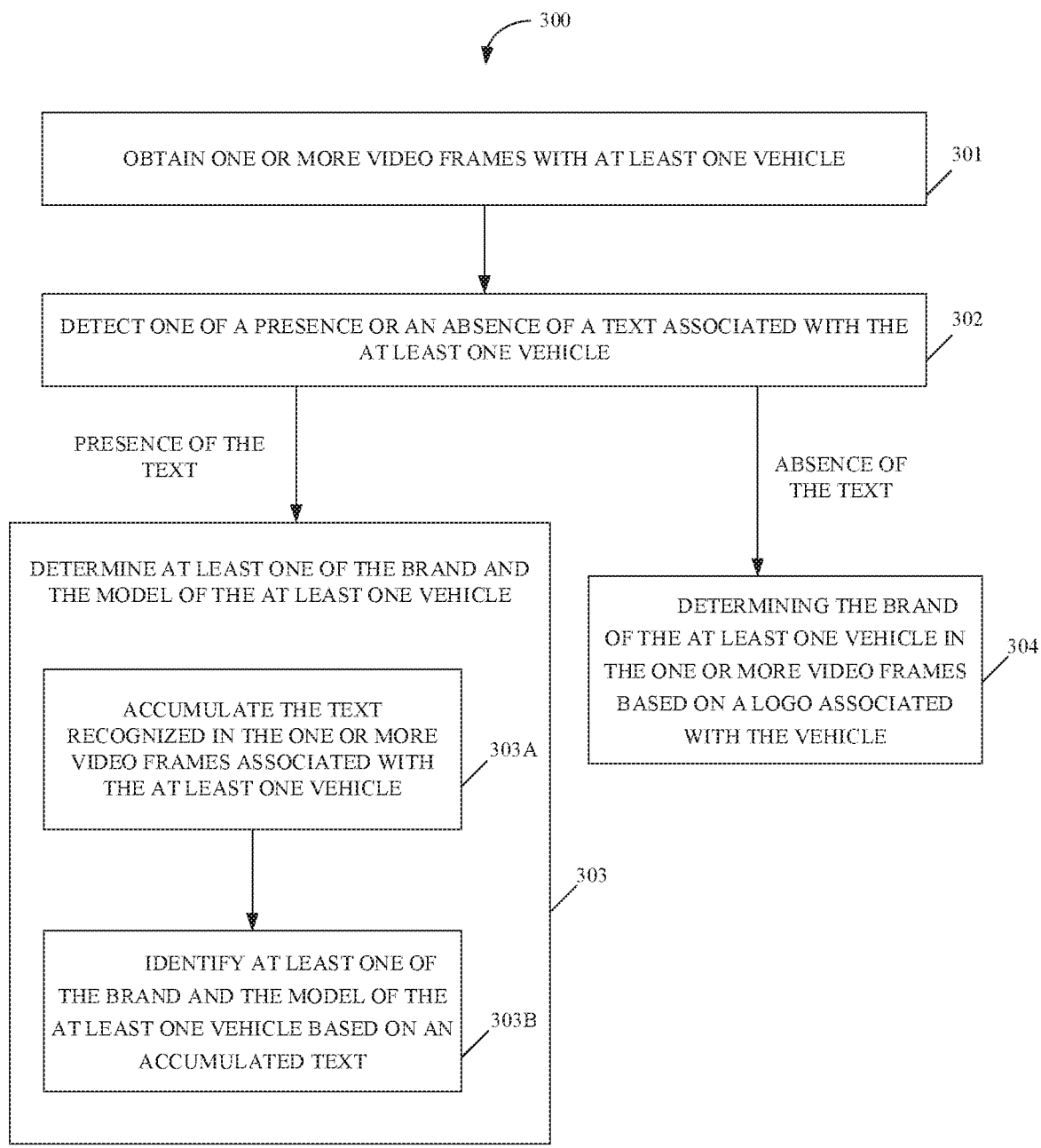
FIG. 3 shows a flowchart illustrating method steps for identifying a brand and a model of a vehicle, in accordance with some embodiment of the present disclosure.

FIG. 3 shows a flowchart illustrating method steps for identifying the brand and the model of the at least one vehicle, in accordance with some embodiment of the present disclosure.

The order in which the method 300 may be described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At the step 301, the computing system (101) may obtain the one or more video frames (102) with the at least one vehicle (104) in the one or more video frames (102) from the at least one video capturing device (106).

Figure 4A:
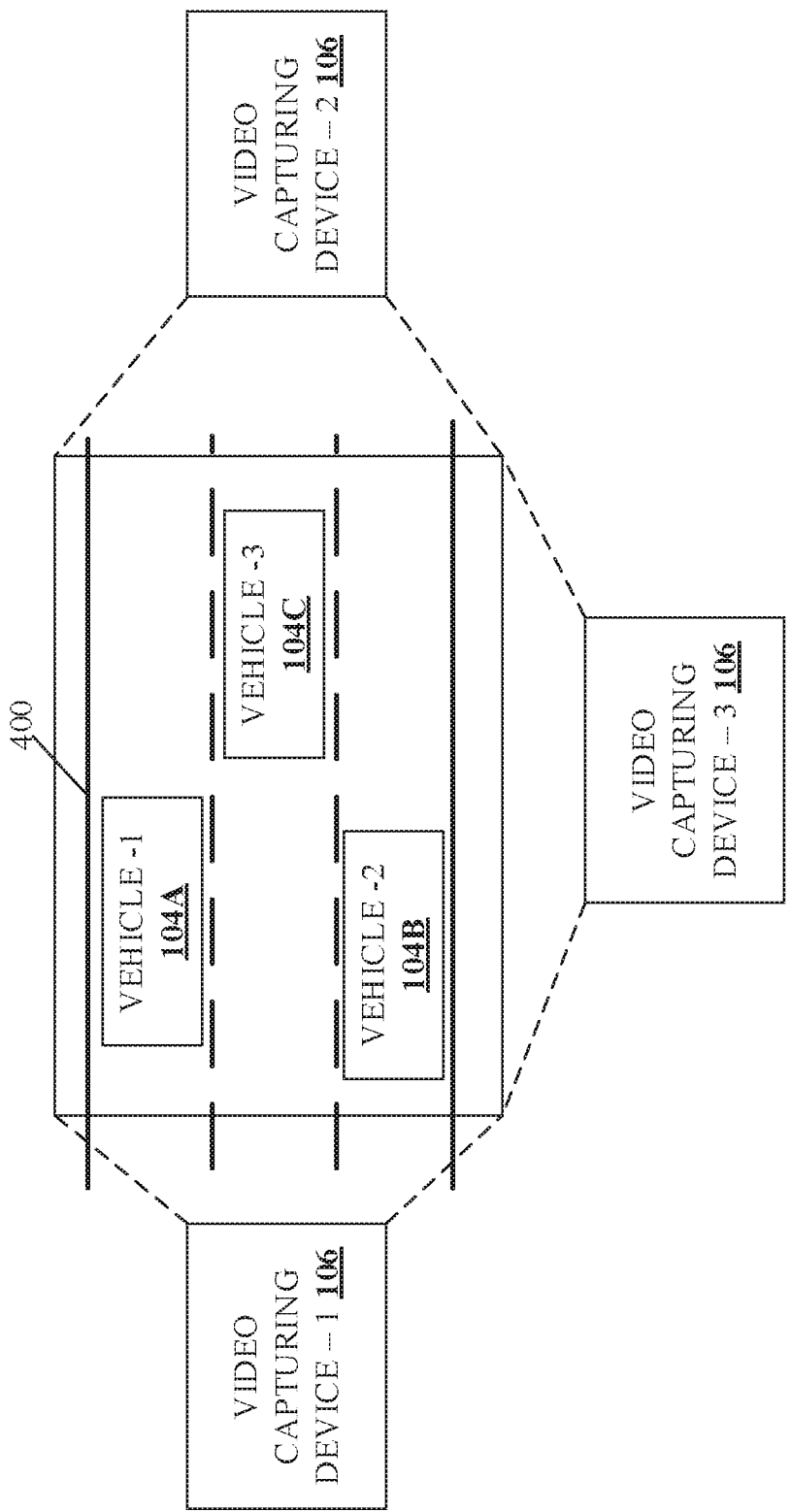
FIG. 4A shows an exemplary environment for capturing the video frames from the video capturing device of a vehicle, in accordance with some embodiments of the present disclosure.

In an embodiment, the at least one video capturing device (106) may be the camera housed along a road (400) at a predetermined location as shown in FIG. 4A, the camera associated with the smartphone, the standalone camera and the like. The at least one video capturing device (106) is placed at the predetermined location to capture the at least one moving vehicle (104A, 104B, 104C) from one or more viewing angles as shown in FIG. 4A. In an embodiment, the one or more video frames (102) are captured for moving vehicles and an image (i.e. one frame) is captured for the vehicles in a parked state. Further, the one or more video frames (102) may be stored in the storage medium (103) associated with the computing system (101).

In an embodiment, the computing system (101) may receive the one or more video frames (102), in real-time, from each of the at least one video capturing device (106). In another embodiment, the computing system (101) may retrieve the one or more video frames (102) associated with a pre-recorded video from the storage medium (103). Further, the computing system (101) may detect the at least one moving vehicle (104A, 104B, 104C) in the one or more video frames (102) for identifying the brand (105A) and the model (105B) of the at least one vehicle (104). If the at least one vehicle (104) is not detected in the one or more frames, the one or more frames may be discarded.

Figure 4B:
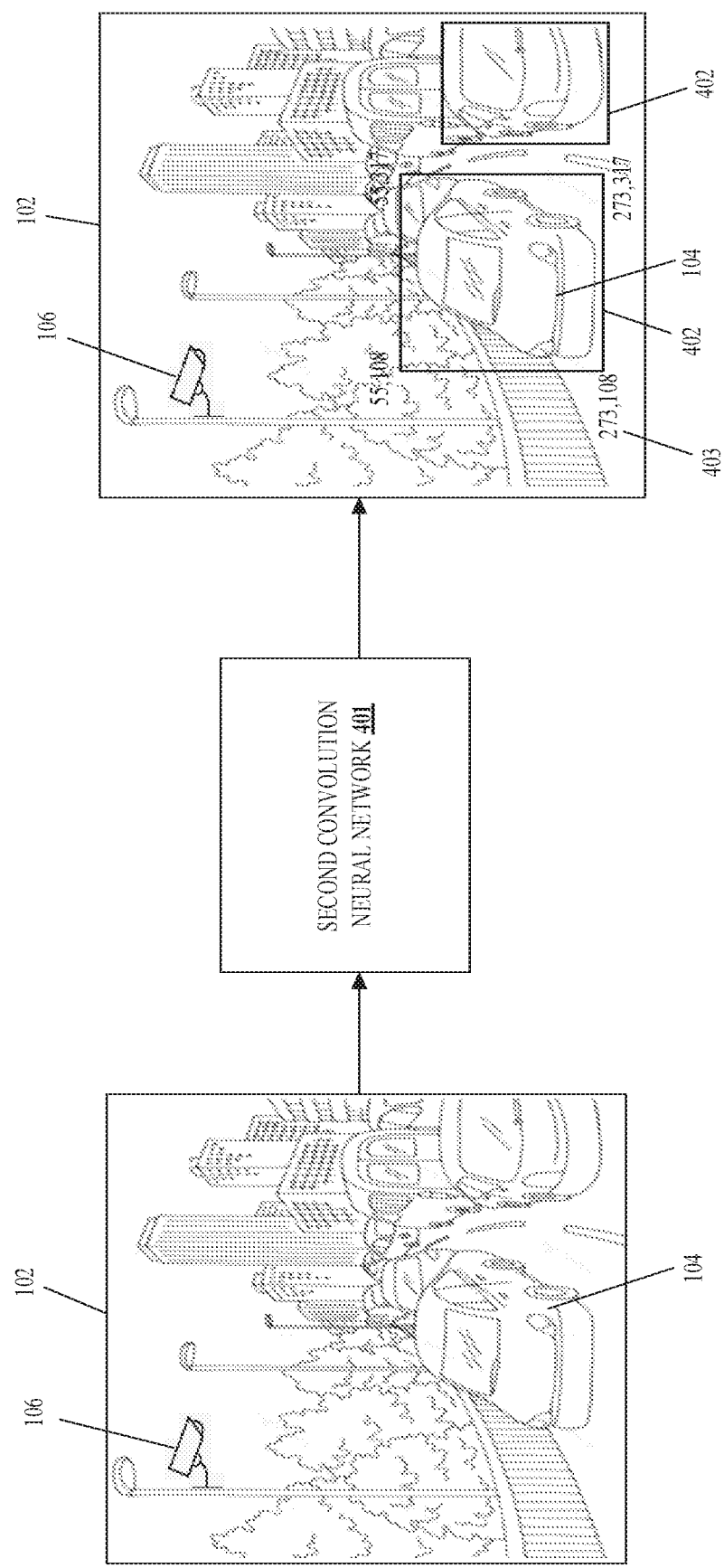
FIG. 4B shows an exemplary detection of a vehicle and determination of a location of a segment, in accordance with some embodiments of the present disclosure.

In an embodiment, the computing system (101) may detect the at least one vehicle (104) in the one or more video frames (102) using the second convolution neural network (401) as shown in FIG. 4B. The second convolution neural network (401) may be pre-trained to identify the at least one vehicle (104) in each of the one or more video frames (102). The second convolution neural network (401) may include one or more of a convolution layer, a pooling layer, a fully connected layer, a loss layer and the like. For example, a YOLO convolution neural network may be used to detect the at least one vehicle (104). Further, the computing system (101) may determine the location (403) of the segment (402) associated with the at least one vehicle (104) in the one or more video frames (102) as shown in FIG. 4B. The location (403) may indicate the coordinates associated with the segment (402). The segment (402) comprises the at least one vehicle (104) and is denoted by a polygon (i.e. a rectangle or a square) encompassing the at least one vehicle (104) as shown in FIG. 4B. The location (403) indicates the position of the segment (402) in the one or more video frames (102). The location (403) may be denoted using the row number and the column number of the polygon encompassing the at least one vehicle (104) as shown in FIG. 4B. For example, the location (403) of the segment (402) represented as a rectangle may be [(X,Y), length=150 pixels, width=84 pixels], where X and Y are the coordinates of a top left corner of the rectangle. Furthermore, the computing system (101) may associate a unique tracking value for each of the at least one vehicle (104) detected in the one or more video frames (102). The unique tracking value is used to identify a displacement of the at least one vehicle (104) in the one or more video frames (102). For example, the unique tracking value may be a combination of alphanumeric characters such as "V-1", "Bike-1", "car-1", "10241", "A-1038" and the like. The displacement may be measured using at least one of a chessboard distance and an Euclidean distance. For example, if the one or more video frames include 2 cars and 1 bike, the computing system (101) detects the 2 cars and 1 bike, further determines the location (403) of the segment (402) of the 2 cars and 1 bike. The FIG. 4B is only an example and should not be treated as a limitation for detecting the at least one vehicle (104).

Figure 4C:
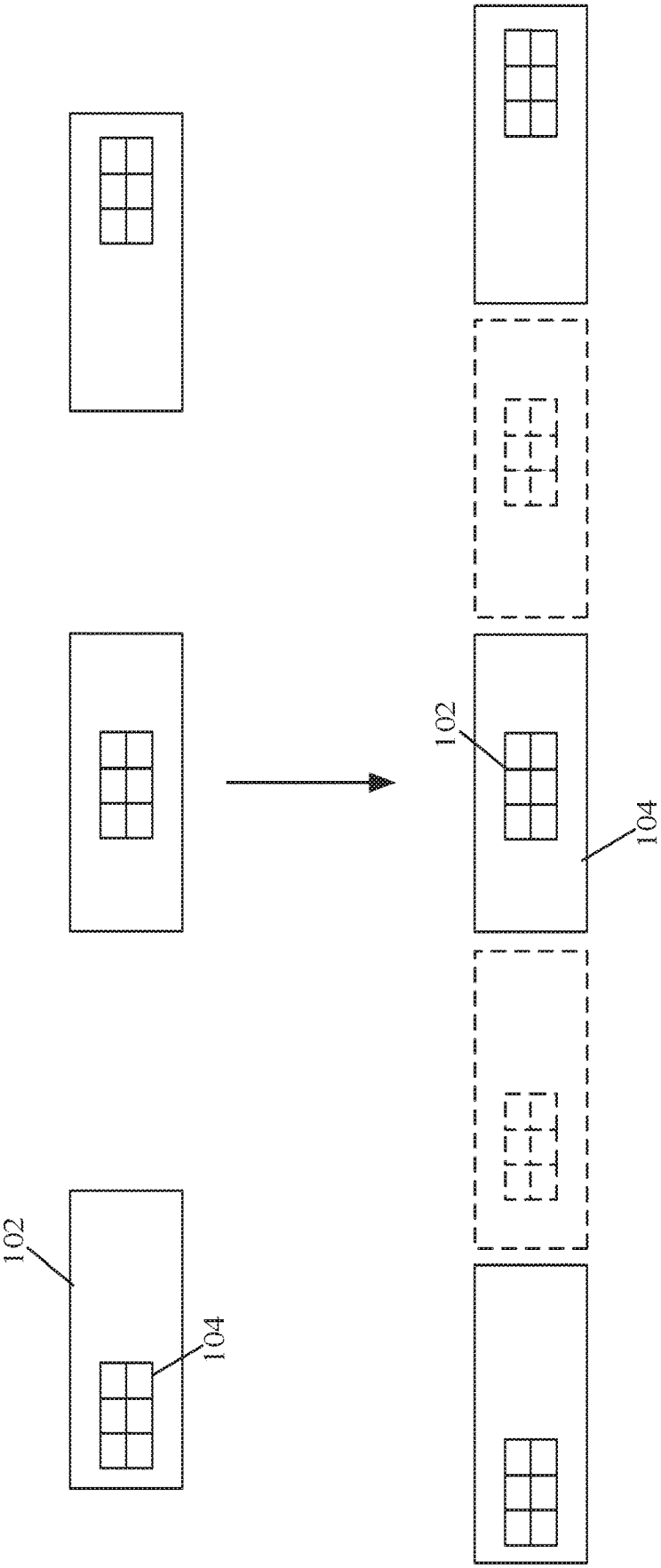
FIG. 4C shows an exemplary frame interpolation in one or more video frames, in accordance with some embodiments of the present disclosure.

In an embodiment, the computing system (101) may modify a count associated with the one or more video frames (102) by performing one of a frame interpolation as shown in FIG. 4C or dropping a frame as shown in FIG. 4D. The frame interpolation indicates the addition of frames (denoted by the dotted line) to the one or more video frames (102) as shown in FIG. 4C. For example, the computing system (101) performs frame interpolation by adding 2 frames (denoted by the dotted line) to the one or more video frames (102) as shown in FIG. 4C. The dropping of the frame indicates a deletion or removal of the frames in the one or more video frames (102) as shown in FIG. 4D. For example, the computing system (101) performs dropping of the frame by deleting 1 frame for the one or more video frames (102) as shown in FIG. 4D. The computing system (101) performs frame interpolation when the at least one vehicle (104) detected in the one or more video frames (102) is traveling at a higher speed and the dropping of the frame when the at least one vehicle (104) in the one or more video frames (102) is traveling at a lower speed. The computing system (101) may provide "N" number of video frames (102) for each of the at least one vehicle (104) for identifying the brand (105A) and the model (105B). The value of "N" may be predetermined by a user. For example, "N" may be 10, 15, 20 and the like. The computing system (101) observes at least three consecutive video frames (102) and performs one of the frame interpolation or the dropping of the frame. For example, if the at least one vehicle (104) is moving at a higher speed then the computing system (101) may not obtain "N" video frames for identifying the brand (105A) and the model (105B), therefore, the computing system (101) decides to perform frame interpolation up to "N" video frames. In another example, if the at least one vehicle (104) is moving at a lower speed then the computing system (101) may obtain more than "N" frames for identifying the brand (105A) and the model (105B), therefore, the computing system (101) decides to perform dropping of the video frames up to "N". The count of the frames for performing the frame interpolation or the dropping of the frame is based on at least one of the required number of video frames (102) (denoted by "N" frames per second), length of the field of view (i.e. length of the one video frame denoted by "L" pixels), length of the at least one vehicle (104) (denoted by "s" pixels), position of the at least one vehicle (104) (denoted by "pos" pixels), present frame number (denoted by "n") and the distance travelled by the at least one vehicle (104) from a first frame to the subsequent second frame (denoted by "d" pixels).

Referring back to FIG. 3, at the step 302, the computing system (101) may detect one of the presence or the absence of the text associated with the at least one vehicle (104) in the one or more video frames (102).

Figure 4E:
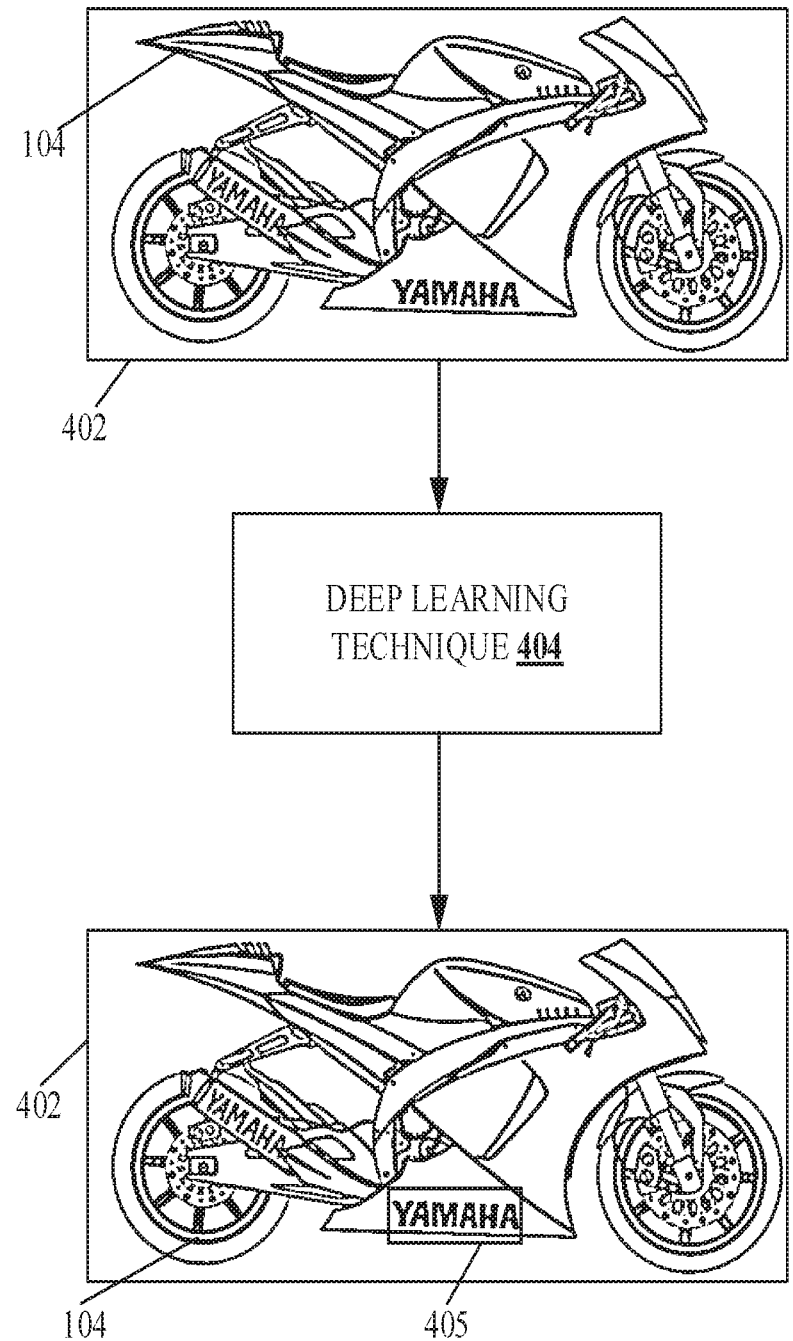
FIG. 4E shows an exemplary detection of a text associated with a vehicle, in accordance with some embodiments of the present disclosure.

In an embodiment, the computing system (101) may detect the presence or the absence of the text in the segment (402) comprising the at least one vehicle (104) for each of the one or more video frames (102) using a deep learning technique (404) as shown in FIG. 4E. Further, the computing system (101) may determine the portion (405) of the segment (402) comprising the text in each of the one or more video frames (102) as shown in FIG. 4E. For example, EAST text detector based on the deep learning technique (404) may be used to detect one of the presence or the absence of the text in the one or more video frames (102).

Referring back to FIG. 3, at the step 303, upon detecting the presence of the text, the computing system (101) may determine at least one of the brand (105A) and the model (105B) of the at least one vehicle (104) in the one or more video frames (102). In an embodiment, determining at least one of the brand (105A) and the model (105B) of the at least one vehicle (104) may be performed as detailed in the steps 303A and 303B.

Figure 4F:
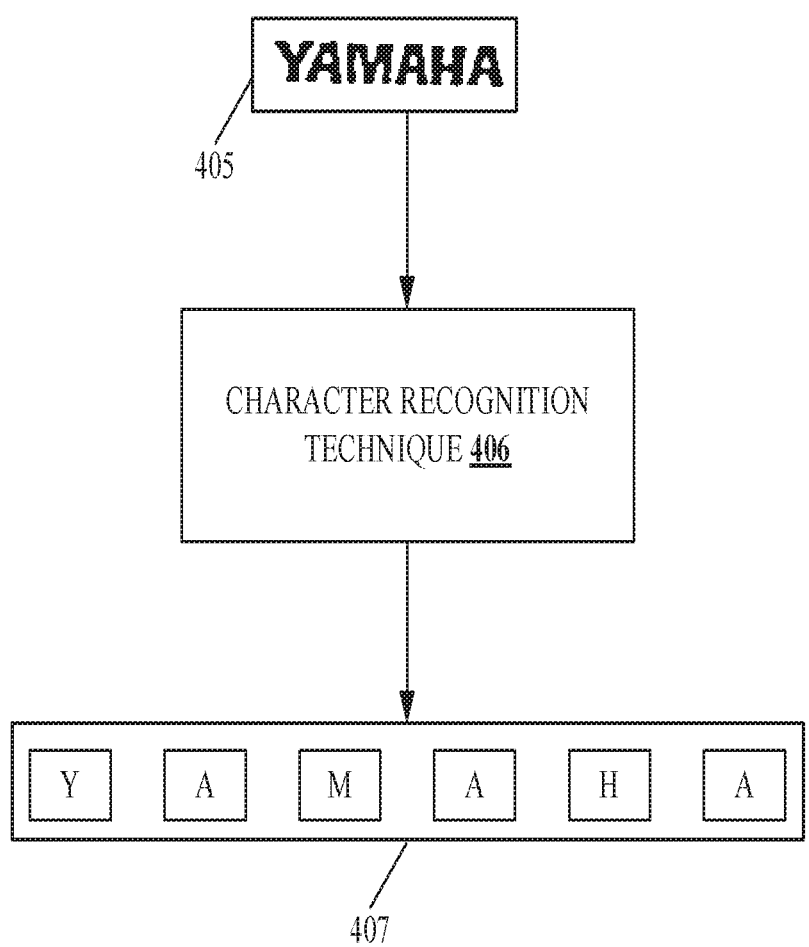
FIG. 4F shows an exemplary text recognition from a portion of a segment in a video frame, in accordance with some embodiments of the present disclosure.

At the step 303A, the computing system (101) may accumulate the text recognized in the one or more video frames (102) associated with the at least one vehicle (104) based on image processing techniques and character recognition techniques. In an embodiment, the computing system (101) may apply the image processing techniques to the portion (405) of the segment (402) comprising the text in each of the one or more video frames (102). The segment (402) includes the at least one vehicle (104) and the portions includes the plurality of pixels comprising the text in the segment (402). The image processing techniques may include at least one of transforming a color image to a grayscale image, modifying a contrast, noise removal, binarizing, and modifying an orientation, of the portion (405) of the segment (402) comprising the text in each of the one or more video frames (102). In an embodiment, after applying the image processing techniques on the portion (405) comprising the text (407), the computing system (101) may recognize one or more characters of the text (407) present in the portion (405) of the segment (402) in one or more video frames (102) using the character recognition technique (406) as shown in FIG. 4F. For example, the character recognition technique (406) may include optical character recognition, clustering based character recognition, neural network based character recognition, pattern matching based character recognition and the like. Further, the computing system (101) aggregates the recognized one or more characters of the text (407) present in the portion (405) of the one or more video frames (102) as shown in FIG. 4F.

Figure 4G:
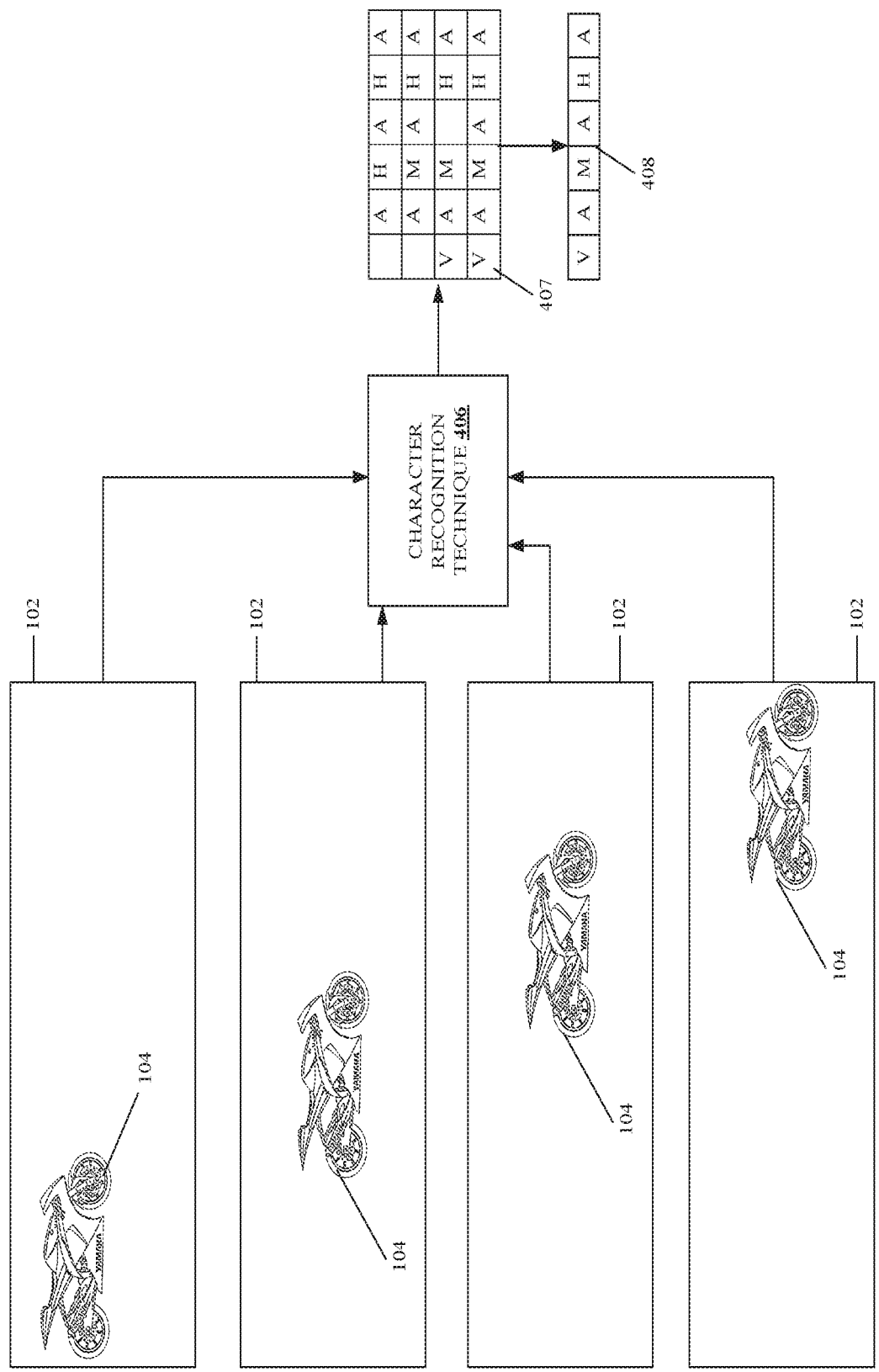
FIG. 4G shows an exemplary accumulation of a recognized text from one or more video frames, in accordance with some embodiments of the present disclosure.

At the step 303B, the computing system (101) may identify at least one of the brand (105A) and the model (105B) of the at least one vehicle (104) based on an accumulated text (407). In an embodiment, the computing system (101) aligns the text (407) recognized in the each frame from the one or more video frames (102) with the text (407) recognized in a previous frame as shown in FIG. 4G. The computing system (101) may align the text (407) by computing the displacement of the at least one vehicle (104) in the each frame from the one or more video frames (102) based on a comparison with the previous frame using the location (403) of the segment (402) associated with the at least one vehicle (104) and one or more distance metrics. For example, the one or more distance metrics may be the chessboard distance, the Euclidean distance and the like. Further, the computing system (101) may arrange the text (407) recognized in the each frame from the one or more video frames (102) with the corresponding at least one vehicle (104) based on the displacement using a pair-wise alignment technique as shown in FIG. 4G. The pairwise alignment technique arranges one or more sequence of texts with highest matching between the one or more characters in the one or more texts. For example, the pairwise alignment technique may include one of a dot-matrix method, a dynamic programming method, and a word method.

In an embodiment, the computing system (101) may determine the one or more characters (408) with maximum occurrence from the aligned text (407) as shown in FIG. 4G. Further, the computing system (101) identifies at least one of the brand (105A) and the model (105B) of the at least one vehicle (104) by comparing the one or more characters (408) with the mapping table (409) shown in FIG. 4H stored in the storage medium (103). The mapping table (409) comprises the names of brands and the model (105B) of the vehicles.

The computing unit may use a Levenshtein distance for comparing the one or more characters (408) with the mapping table (409). For example, the one or more characters (408) "VAMAHA" is compared with the mapping table (409) and the brand (105A) of the at least one vehicle (104) is identified as "YAMAHA". Similarly the computing system (101) may identify the model (105B) of the at least one vehicle (104) from the one or more characters (408) determined from the aligned text (407), where the aligned text (407) is recognized and detected in the portion (405) of the segment (402) from the one or more video frames (102).

In an embodiment, when the brand (105A) of the at least one vehicle (104) is identified and the model (105B) is not identified, the computing system (101) ignores the model (105B) identification and does not perform the logo detection. In another embodiment, when the model (105B) of the at least one vehicle (104) is identified and the brand (105A) is not identified, the computing system (101) identifies the brand (105A) of the at least one vehicle (104) from the mapping table (409). For example, if the model (105B) identified is "A4", using the mapping table (409), the computing system (101) identifies the brand (105A) of the at least one vehicle (104) as "Audi" by selecting the value present in the first row corresponding to the column of "A4" in the mapping table (409). In yet another embodiment, when the brand (105A) and the model (105B) of the at least one vehicle (104) is not identified, the computing system (101) performs the logo detection.

Referring back to FIG. 3, at the step 304, upon detecting the absence of the text (407), the computing system (101) determining the brand (105A) of the at least one vehicle (104) in the one or more video frames (102) based on a logo associated with the vehicle, wherein the logo is identified using a first convolution neural network from the one or more video frames (102).

In an embodiment, identifying one or more Regions of Interest (ROIs) in the one or more video frames (102) using a selective search technique. Further, the computing system (101) may generate a feature vector using the first convolution neural network based on the one or more ROIs. For example, a DeepLogo-DRCN framework may be used as the first convolution neural network. Furthermore, the computing system (101) may determine the logo and the brand (105A) based on the feature vector using the first convolution neural network. For example, for each of the one or more video frames (102), the first convolution neural network of the DeepLogo-DRCN framework generates the one or more ROIs using the selective Search technique. The one or more ROIs are provided as an input to a fully convolutional neural network of the first convolution neural network. The fully convolutional neural network pools each of the one or more ROIs into a fixed-size feature map. Further, the feature map is mapped to the feature vector by fully connected layers of the first convolution neural network. Furthermore, the first convolution neural network comprises an object classifier and bounding box regressor for determining the brand (105A) of the at least one vehicle (104) in the one or more video frames (102).

The method of identifying the brand (105A) and the model (105B) of the at least one vehicle (104) uses a text recognition based technique to determine the brand (105A) and the model (105B). Further, when the text detection or the text recognition fails, the logo-based brand (105A) and the model (105B) detection is performed. The text-based brand (105A) and the model (105B) identification does not require training specific to the vehicle. The modification of the count associated with the one or more video frames (102) increases the accuracy of the identifying the brand (105A) and the model (105B). Further, text recognition performed on each of the one or more frames and accumulating the text (407) for identifying the brand (105A) and the model (105B) increases the accuracy. The text based brand (105A) and the model (105B) identification may be used to identifying the brand (105A) and the model (105B) of a new vehicle or an existing vehicle with a modified shape without the need to train the text detection and text recognition techniques. Further, the text-based brand (105A) and the model (105B) identification require less computational resources and less delay or latency when compared with image-based recognition techniques. The text-based brand (105A) and the model (105B) identification is performed on the portion (405) of the one or more video frames (102) unlike the image based recognition techniques which is processed on the entire image or the one or more video frames (102).

Computer System

Figure 5:
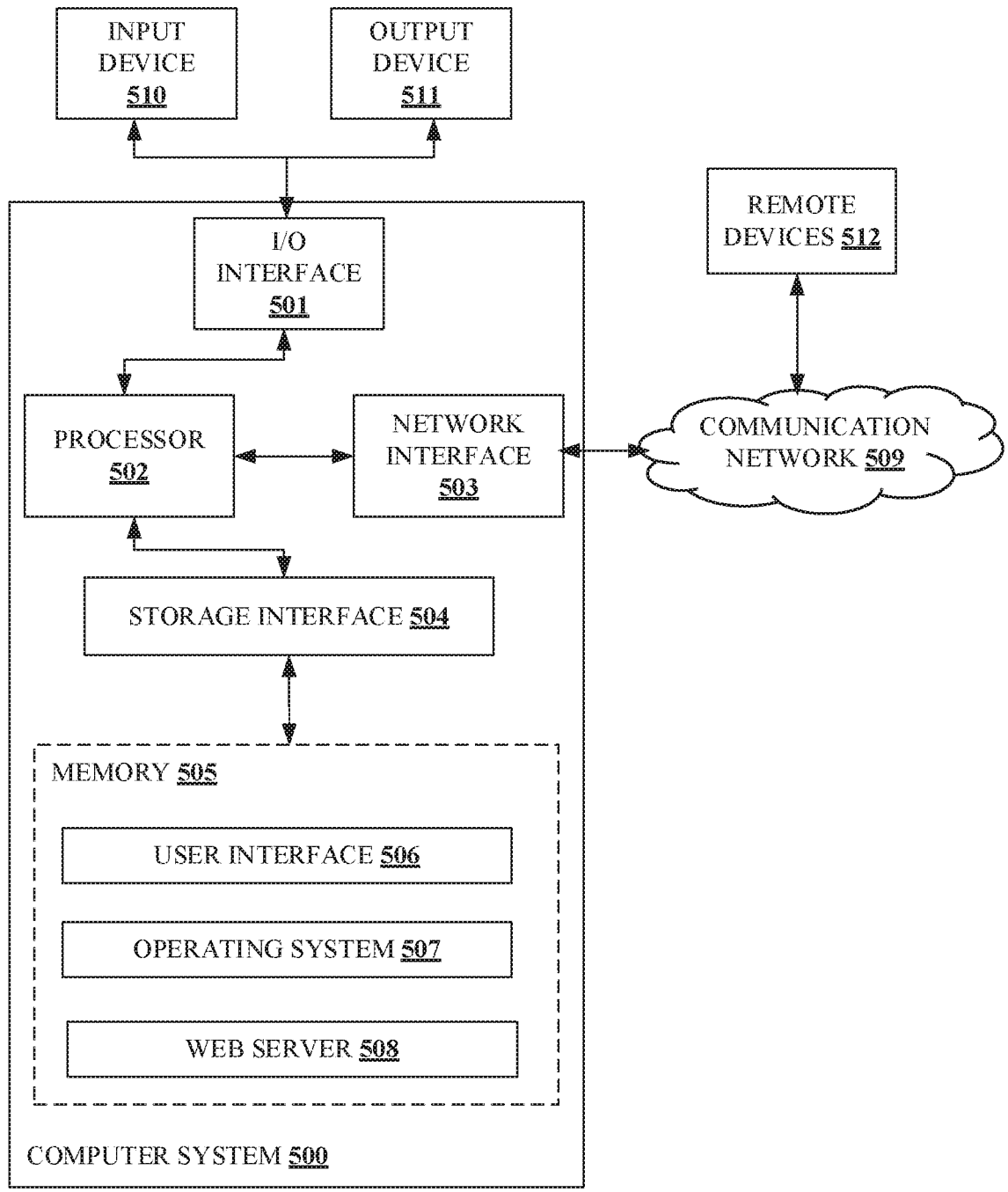
FIG. 5 shows an exemplary computer system for identifying a brand and a model of a vehicle, in accordance with some embodiments of the present disclosure.

FIG. 5 illustrates a block diagram of an exemplary computer system (500) for implementing embodiments consistent with the present disclosure. In an embodiment, the computer system (500) may be used to implement the method identifying the brand (105A) and the model (105B) of the vehicle. The computer system (500) may comprise a central processing unit ("CPU" or "processor") (502). The processor (502) may comprise at least one data processor for executing program components for dynamic resource allocation at run time. The processor (502) may include specialized processing units such as integrated system (bus) controllers, memory management control units, floating point units, graphics processing units, digital signal processing units, etc.

The processor (502) may be disposed in communication with one or more input/output (I/O) devices (not shown) via I/O interface (501). The I/O interface (501) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (501), the computer system (500) may communicate with one or more I/O devices. For example, the input device (510) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (511) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (500) is connected to the service operator through a communication network (509). The processor (502) may be disposed in communication with the communication network (509) via a network interface (503). The network interface (503) may communicate with the communication network (509). The network interface (503) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (509) may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (503) and the communication network (509), the computer system (500) may communicate with the one or more service operators.

In some embodiments, the processor (502) may be disposed in communication with a memory (505) (e.g., RAM, ROM, etc. not shown in FIG. 5 via a storage interface (504). The storage interface (504) may connect to memory (505) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (505) may store a collection of program or database components, including, without limitation, user interface (506), an operating system (507), web server (508) etc. In some embodiments, computer system (500) may store user/application data (506), such as the data, variables, records, etc. as described in this disclosure. Such databases may be implemented as fault-tolerant, relational, scalable, secure databases such as Oracle or Sybase.

The operating system (507) may facilitate resource management and operation of the computer system (500). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system (500) may implement a web browser (not shown in the Figure) stored program component. The web browser may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers (508) may utilize facilities such as AJAX, HTML, ADOBE® FLASH®, JAVASCRIPT®, JAVA®, Application Programming Interfaces (APIs), etc. In some embodiments, the computer system (500) may implement a mail server stored program component not shown in the Figure). The mail server may be an Internet mail server such as Microsoft Exchange, or the like. The mail server may utilize facilities such as Active Server Pages (ASP), ACTIVEX®, ANSI®, C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some embodiments, the computer system (500) may implement a mail client stored program component not shown in the Figure). The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium (103) refers to any type of physical memory on which information or data readable by a processor may be stored. Thus, a computer-readable storage medium (103) may store instructions for execution by one or more processors, including instructions for causing the processors to perform steps or stages consistent with the embodiments described herein. The term "computer-readable medium" should be understood to include tangible items and exclude carrier waves and transient signals, i.e., non-transitory. Examples include Random Access memory (RAM), Read-Only memory (ROM), volatile memory, non-volatile memory, hard drives, Compact Disc (CD) ROMs, Digital Video Disc (DVDs), flash drives, disks, and any other known physical storage media.

In some implementation, the one or more video frames (102) may be received from the remote devices (512). In an embodiment, the remote devices (512) may be the computing system (101).

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope being indicated by the following claims.

REFERRAL NUMERALS:

| Reference number | Description |
| --- | --- |
| 101 | Computing system |
| 102 | One or more video frames |
| 103 | Storage medium |
| 104 | At least one vehicle |
| 105A | Brand |
| 105B | Model |
| 106 | Video capturing device |
| 201 | I/O interface |
| 202 | Memory |
| 203 | Processor |
| 204 | Data |
| 205 | Video data |
| 206 | Text data |
| 207 | Logo data |
| 208 | Other data |
| 209 | Modules |
| 210 | Vehicle detection module |
| 211 | Text detection module |
| 212 | Text recognition module |
| 213 | Logo detection module |
| 214 | Other module |
| 400 | Road |
| 401 | Second convolution neural network |
| 402 | Segment |
| 403 | Location |
| 404 | Deep learning technique |
| 405 | Portion |
| 406 | Character recognition technique |
| 407 | Text |
| 408 | Characters |
| 409 | Mapping table |
| 500 | Computer System |
| 501 | I/O interface |
| 502 | Processor |
| 503 | Network Interface |
| 504 | Storage Interface |
| 505 | Memory |
| 506 | User Interface |
| 507 | Operating System |
| 508 | Web Server |
| 509 | Communication Network |
| 510 | Input Device |
| 511 | Output Device |
| 512 | Remote Devices |

We claim:

1. A method of identifying a brand and a model of a vehicle, the method comprises:
obtaining, by a computing system, a plurality of video frames with at least one vehicle in the plurality of video frames from at least one video capturing device, wherein obtaining the plurality of video frames comprises modifying a count associated with the plurality of video frames by performing a frame interpolation when the at least one vehicle moves at a speed higher than a certain speed; and
detecting, by the computing system, one of a presence or an absence of a text associated with the at least one vehicle in the plurality of video frames;
upon detecting the presence of the text, determining, by the computing system, at least one of the brand and the model of the at least one vehicle in the plurality of video frames, by performing at least one of:
accumulating the text in the plurality of video frames associated with the at least one vehicle based on image processing techniques and character recognition techniques; and
identifying at least one of the brand and the model of the at least one vehicle based on an accumulated text;
upon detecting the absence of the text, performing by the computing system:
determining the brand of the at least one vehicle in the plurality of video frames based on a logo associated with the at least vehicle, wherein the logo is identified using a first convolution neural network from the plurality of video frames.

2. The method as claimed in claim 1, wherein obtaining the plurality of video frames further comprises:
determining a location of a segment associated with the at least one vehicle in the plurality of video frames; and
modifying the count associated with the one or more video frames by dropping a frame when the at least one vehicle moves at a speed lower than the certain speed.

3. The method as claimed in claim 1, wherein accumulating the text comprises performing at least one of:
applying the image processing techniques to a portion comprising the text in the plurality of video frames, wherein the image processing techniques comprises at least one of transforming the each frame from a color image to a grayscale image, modifying a contrast, noise removal, binarizing, and modifying an orientation, of the each frame;
recognizing one or more characters of the text present in a portion of the plurality of video frames using the character recognition techniques.

4. The method as claimed in claim 3, wherein identifying at least one of the brand and the model comprises:
aligning the text recognized in the each frame in the portion of the plurality of video frames with the text recognized in a previous frame in the portion of the plurality of video frames;
determining one or more characters with maximum occurrence from the aligned text; and
identifying at least one of the brand and the model of the at least one vehicle by comparing the one or more characters with a mapping table stored in a storage medium associated with the computing system.

5. The method as claimed in claim 4, wherein aligning the text comprises:
computing a displacement of the at least one vehicle in the each frame in the portion of the plurality of video frames based on a comparison with the previous frame in the portion of the plurality of video frames using a location of a segment associated with the at least one vehicle and one or more distance metrics; and
arranging the text recognized in the each frame with the corresponding at least one vehicle based on the displacement using a pair-wise alignment technique.

6. The method as claimed in claim 1, wherein determining the brand of the at least one vehicle comprises:
identifying one or more Regions of Interest (ROIs) in the plurality of video frames using a selective search technique;
generating a feature vector using the first convolution neural network based on the one or more ROIs; and
determining the logo and the brand based on the feature vector using the first convolution neural network.

7. A Computing system for identifying a brand and a model of a vehicle, the computing system comprises:
a processor; and
a memory communicatively coupled to the processor, wherein the memory stores a processor instructions, which, on execution, causes the processor to perform operation comprising:
obtaining a plurality of video frames with at least one vehicle in the plurality of video frames from at least one video capturing device, wherein obtaining the plurality of video frames comprises modifying a count associated with the plurality of video frames by performing a frame interpolation when the at least one vehicle moves at a speed higher than a certain speed; and
detecting one of a presence or an absence of a text associated with the at least one vehicle in the plurality of video frames;
upon detecting the presence of the text, determining at least one of the brand and the model of the at least one vehicle in the plurality of video frames by performing at least one of:
accumulating the text in the plurality of video frames associated with the at least one vehicle based on image processing techniques and character recognition techniques; and
identifying at least one of the brand and the model of the at least one vehicle based on an accumulated text;
upon detecting the absence of the text, performing by the computing system:
determining the brand of the at least one vehicle in the plurality of video frames based on a logo associated with the at least vehicle, wherein the logo is identified using a first convolution neural network from the plurality of video frames.

8. The computing system as claimed in claim 7, wherein the processor is further configured to obtain the plurality of video frames comprises:
determining a location of a segment associated with the at least one vehicle in the plurality of video frames; and
modifying a count associated with the one or more video frames by dropping a frame when the at least one vehicle moves at a speed lower than the certain speed.

9. The computing system as claimed in claim 7, wherein the processor is configured to accumulate the text comprises performing at least one of:

applying the image processing techniques to a portion comprising the text in the plurality of video frames, wherein the image processing techniques comprises at least one of transforming the each frame from a color image to a grayscale image, modifying a contrast, noise removal, binarizing, and modifying an orientation, of the each frame;
recognizing one or more characters of the text present in a portion of the plurality of video frames using the character recognition techniques.

10. The computing system as claimed in claim 9, wherein the processor is configured to identify at least one of the brand and the model comprises:
aligning the text recognized in the each frame in the portion of the plurality of video frames with the text recognized in a previous frame in the portion of the plurality of video frames;
determining one or more characters with maximum occurrence from the aligned text; and
identifying at least one of the brand and the model of the at least one vehicle by comparing the one or more characters with a mapping table stored in a storage medium associated with the computing system.

11. The computing system as claimed in claim 10, wherein the processor is configured to align the text comprises:
computing a displacement of the at least one vehicle in the each frame in the portion of the plurality of video frames based on a comparison with the previous frame in the portion of the plurality of video frames using a location of a segment associated with the at least one vehicle and one or more distance metrics; and
arranging the text recognized in the each frame with the corresponding at least one vehicle based on the displacement using a pair-wise alignment technique.

12. The computing system as claimed in claim 7, wherein the processor is configured to determine the brand of the at least one vehicle comprises:
identifying one or more Regions of Interest (ROIs) in the plurality of video frames using a selective search technique;
generating a feature vector using the first convolution neural network based on the one or more ROIs; and
determining the logo and the brand based on the feature vector using the first convolution neural network.

13. A non-transitory computer readable medium including instructions stored thereon that when processed by at least one processor cause a device to perform operations comprising:
obtaining, by a computing system, a plurality of video frames with at least one vehicle in the plurality of video frames from at least one video capturing device, wherein obtaining the plurality of video frames comprises modifying a count associated with the plurality of video frames by performing a frame interpolation when the at least one vehicle moves at a speed higher than a certain speed; and
detecting, by the computing system, one of a presence or an absence of a text associated with the at least one vehicle in the plurality of video frames;
upon detecting the presence of the text, determining, by the computing system, at least one of the brand and the model of the at least one vehicle in the plurality of video frames, by performing at least one of:

accumulating the text in the plurality of video frames associated with the at least one vehicle based on image processing techniques and character recognition techniques; and identifying at least one of the brand and the model of the at least one vehicle based on an accumulated text;

upon detecting the absence of the text, performing by the computing system:

determining the brand of the at least one vehicle in the plurality of video frames based on a logo associated with the at least one vehicle, wherein the logo is identified using a first convolution neural network from the plurality of video frames.

14. The media of claim 13, wherein the instructions causes the processor to obtain the plurality of video frames further comprises:

determining a location of a segment associated with the at least one vehicle in the plurality of video frames; and modifying a count associated with the one or more video frames by dropping a frame when the at least one vehicle moves at a speed lower than the certain speed.

15. The media of claim 13, wherein the instructions causes the processor to accumulate the text comprises performing at least one of:

applying the image processing techniques to a portion comprising the text in the plurality of video frames, wherein the image processing techniques comprises at least one of transforming the each frame from a color image to a grayscale image, modifying a contrast, noise removal, binarizing, and modifying an orientation, of the each frame;

recognizing one or more characters of the text present in a portion of the plurality of video frames using the character recognition techniques.

16. The media of claim 15, wherein the instructions causes the processor to identify at least one of the brand and the model comprises:

aligning the text recognized in the each frame in the portion of the plurality of video frames with the text recognized in a previous frame in the portion of the plurality of video frames;

determining one or more characters with maximum occurrence from the aligned text; and identifying at least one of the brand and the model of the at least one vehicle by comparing the one or more characters with a mapping table stored in a storage medium associated with the computing system.

17. The media of claim 16, wherein the instructions causes the processor to align the text comprises:

computing a displacement of the at least one vehicle in the each frame in the portion of the plurality of video frames based on a comparison with the previous frame in the portion of the plurality of video frames using a location of a segment associated with the at least one vehicle and one or more distance metrics; and arranging the text recognized in the each frame with the corresponding at least one vehicle based on the displacement using a pair-wise alignment technique.

18. The media of claim 13, wherein the instructions causes the processor to determine the brand of the at least one vehicle comprises:

identifying one or more Regions of Interest (ROIs) in the plurality of video frames using a selective search technique;

generating a feature vector using the first convolution neural network based on the one or more ROIs; and determining the logo and the brand based on the feature vector using the first convolution neural network.

19. The method as claimed in claim 5, wherein the pair-wise alignment technique comprises alignment based on at least one of a dot-matrix, a dynamic programming, or a word.

* * * * *